United States Patent
Frasier et al.

(10) Patent No.: US 8,631,766 B2
(45) Date of Patent: Jan. 21, 2014

(54) HORSEBACK RIDING ANIMAL CRADLE

(71) Applicants: Vicki Frasier, Hague, NY (US); Jennie Lou Gunning, Hague, NY (US)

(72) Inventors: Vicki Frasier, Hague, NY (US); Jennie Lou Gunning, Hague, NY (US)

(*) Notice: Subject to any disclaimer, the term of this patent is extended or adjusted under 35 U.S.C. 154(b) by 0 days.

(21) Appl. No.: 13/756,630

(22) Filed: Feb. 1, 2013

(65) Prior Publication Data

US 2013/0199457 A1 Aug. 8, 2013

Related U.S. Application Data

(60) Provisional application No. 61/595,934, filed on Feb. 7, 2012.

(51) Int. Cl.
*A01K 1/00* (2006.01)

(52) U.S. Cl.
USPC .......................................... 119/496; 54/44.2

(58) Field of Classification Search
USPC ......... 119/489, 496–497; 54/38.1, 39.1, 41.1, 54/40.1, 42.1, 44.1–5; 280/1.5; 224/578–586, 493, 905
See application file for complete search history.

(56) References Cited

U.S. PATENT DOCUMENTS

| | | | | |
|---|---|---|---|---|
| 3,036,749 A * | 5/1962 | Evans | ........................ | 224/42.32 |
| 3,941,092 A | 3/1976 | Winters | | |
| 4,003,508 A * | 1/1977 | Hoops | ........................... | 224/419 |
| 4,269,149 A | 5/1981 | Thomas | | |
| 4,320,862 A * | 3/1982 | Bettenhausen | ................ | 224/492 |
| 5,133,294 A | 7/1992 | Reid | | |
| 5,277,148 A * | 1/1994 | Rossignol et al. | ............ | 119/453 |
| 5,445,302 A * | 8/1995 | Holtorf | ......................... | 224/629 |
| 5,551,615 A * | 9/1996 | McIntosh | ...................... | 224/270 |
| 5,746,364 A * | 5/1998 | Stengrim | ...................... | 224/572 |
| 5,967,579 A * | 10/1999 | Hebert | ............................ | 294/74 |
| 6,179,187 B1 * | 1/2001 | Lemire et al. | ................. | 224/640 |
| 7,204,205 B2 | 4/2007 | O'Donnell | | |
| 7,628,120 B2 | 12/2009 | Beeler | | |
| 2005/0217599 A1 | 10/2005 | Varner | | |
| 2006/0213452 A1 * | 9/2006 | King | ............................. | 119/496 |
| 2009/0078713 A1 * | 3/2009 | Quick et al. | ................. | 220/694 |
| 2009/0211536 A1 | 8/2009 | Phipps | | |
| 2010/0064642 A1 * | 3/2010 | Talent | ............................ | 54/44.2 |

* cited by examiner

*Primary Examiner* — Monica Williams
*Assistant Examiner* — Joshua Huson
(74) *Attorney, Agent, or Firm* — Daniel Boudwin; Global Intellectual Property Agency, LLC

(57) ABSTRACT

Disclosed is a horseback riding animal and article carrier attachable to a horse saddle. The device comprises a housing having upstanding sidewalls, a plurality of securement straps and an elastic contact pad. The housing is an open enclosure having upstanding sidewalls, a base and an open upper to support a pet or a plurality of personal items therein. Along the underside of the base and extended along a forward side of the housing is a contact pad that bears against a horse croup and the backside of a horse saddle cantle. An upstanding, horizontal and diagonal strap are provided along the sides of the housing connect to a saddle strap connectable to a saddle girth along both sides of the horse. The straps are length adjustable to tension the straps and draw the housing toward the horse and the saddle during use.

8 Claims, 3 Drawing Sheets

HORSEBACK RIDING ANIMAL CRADLE

CROSS REFERENCE TO RELATED APPLICATION

This application claims the benefit of U.S. Provisional Application No. 61/595,934 filed on Feb. 7, 2012, entitled "Small Dog Saddle Buddy." The above identified patent application is herein incorporated by reference in its entirety to provide continuity of disclosure.

BACKGROUND OF THE INVENTION

1. Field of the Invention

The present invention relates to pet carriers and horse saddle accessories. More specifically, the present invention relates to a saddle pet carrier supported by the croup region of a horse and tensioned against a horse saddle girth and the backside of a saddle cantle.

Horseback riding can be a leisure activity or a function of one's work during the course of a day. Horses provide a means of transportation that are more flexible than motor vehicles and a mode that is less enjoyable as an activity. Horses can better navigate less developed areas, and owners may enjoy riding their horse for periods of time for relaxation and enjoyment. However, horses have limited carrying capacity. The ability of the user to store personal items and pets is limited by the design of most horse saddles and their accessories.

The present invention contemplates a particular class of horseback riders and the needs therefor. Specifically, those horseback riders who have animal pets or work animals that the riders wish to take along with them during their riding. These individuals include everyday pet owners and horseback riders, as well as hunters who employ work dogs or hunting dogs. The ability to carry the pet or work animal over longer distances and with the rider is of particular importance in the present invention, wherein a secure cradle is presented for attachment to an existing horse saddle.

Many horseback riders would like to take their pets with them when going on horseback rides, as pets such as dogs are often enthusiastic about being with their owner and would enjoy the outdoors as much as their owner. Some owners limit their time away from their pets because of guilt when leaving them alone. Small dogs and other pets, however, can have a difficult time keeping up with a horse and can quickly become exhausted over an extended trip. The horse may accidentally step on small dogs, which can severely injure them in the field. Some riders may try to hold or balance the dog on the horse, but this can be dangerous for the rider, the dog, and the horse.

The present invention provides a housing that is adapted to connect to a horse saddle via its saddle girth, whereby the housing sits behind the rider and is drawn against the backside of the saddle cantle and towards the saddle girth for secure support. The base of the housing and its connection area against the saddle cantle comprises a padded region to protect the horse, the saddle and the housing from injury and wear. The goal is to provide a support for a small or mid-sized dog, pet, or a plurality of personal items that can be carried by the horse and without vigilant supervision by the rider. A series of straps that are akin to a child safety seat within a vehicle are used to secure the assembly firmly into place and in connection with the saddle while riding.

2. Description of the Prior Art

Devices have been disclosed in the prior art that relate to animal carrying device. These include devices that have been patented and published in patent application publications, and generally relate to vehicle animal carriers of diverging construction and intent from that provided in the present disclosure. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 7,204,205 to O'Donnell discloses a pet console seat having a central frame forming upstanding sides and a bottom to support the pet therein. A front and rear strap connect to secondary straps that secure the assembly to a vehicle console, while an interior tether secures to the pet to control its movement while the vehicle is in motion and while the pet is positioned inside the bed structure. While the O'Donnell device contemplates a housing for a pet for use with a vehicle, its structure is particularly suited for connection to an underlying support, while the present invention is supported against the seatback of a horse saddle. The tethers of the present invention are tensioned against the saddle while the base of the assembly is supported by a horse hind region.

U.S. Published Patent Application Publication No. 2009/0211536 to Phipps discloses a carrier device for horse saddles that includes a housing having an open top and sidewalls having holes to accommodate a dog's head and paws therethrough. A harness is provided inside the device to secure the dog in a prone or seated position, which the housing secures to the saddle girth. Inserts placed within the housing change the volume of the box to accommodate smaller dogs or to fill the housing when not carrying a dog therein. The harness within the housing includes attachment points to the base of the housing to prevent the animal for jumping out of the box. No mention is made in the Phipps device that teaches of a means to secure the housing to the saddle girth in a safe or secure manner to avoid tipping of the housing or disconnection. The present invention contemplates a plurality of side straps that combine into a single saddle strap that is adjustable tensioned from the saddle girth supported around the torso of the horse. The structure and connection of the Phipps device diverges from that of the present invention.

U.S. Pat. No. 5,133,294 to Reid discloses another pet carrier for use in a vehicle, wherein a platform having low side panels and an elongated and upstanding rear panel. The panels are pivotably connected to the base, while a tether is adapted to retain the pet on the platform while the vehicle is in motion and the pet may move or be shifted by changes in momentum. The device can be condensed by collapsing the rear panel against the platform, while the tether connects from the base of the rear panel and extends over its upper edge to support pet in an upright or seated position. The Reid device is a novel, collapsible pet support for a vehicle; however its structure does not lend itself for use with a horse saddle, as provided by the present invention.

U.S. Published Patent Application Publication No. 2005/0217599 to Varner discloses an animal carrier for carrying an animal on a motorcycle. The device comprises a housing having a base and a sidewall for attaching to a motorcycle saddlebag mount or sidecar mount. The housing includes an opening along its upper surface and a rear enclosure for the animal to rest out of the path of wind while the vehicle is in motion. Similar to the aforementioned devices, the Varner device fails to disclose a novel horseback riding pet carrier that is securely attachable to a horse saddle.

The present invention provides a secure means to transport a pet or a plurality of personal items behind a horseback rider. The device includes securement straps that attached an upstanding housing or crate to the back of a horse saddle, drawing the housing towards the saddle cantle and girth, and allowing the topside of the horse support the weight of the housing and animal therein. It is submitted that the present invention is substantially divergent in design elements from the prior art, and consequently it is clear that there is a need in the art for an improvement to existing saddle carrier devices. In this regard the instant invention substantially fulfills these needs.

SUMMARY OF THE INVENTION

In view of the foregoing disadvantages inherent in the known types of horseback saddle carrier devices now present in the prior art, the present invention provides a new carrier that can be utilized for providing convenience for the user when traveling with an animal or personal items while horseback riding without requiring any user support.

It is therefore an object of the present invention to provide a new and improved horseback saddle carrier device that has all of the advantages of the prior art and none of the disadvantages.

It is another object of the present invention to provide a horseback saddle carrier device that provides a housing that is secured against the backside of a horse saddle, whereby straps secure to the saddle girth and the straps are tensioned to bear the housing against the saddle cantle and the horse croup.

Another object of the present invention is to provide a horseback saddle carrier device that comprises a plurality of straps to prevent movement of the housing relative to the saddle during deployment, preventing spillage or tipping due to changes in momentum.

Yet another object of the present invention is to provide a horseback saddle carrier device that comprises three side straps along the housing exterior that combine into a single strap leading to the saddle girth, whereby all of the straps are adjustable for tension and release.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
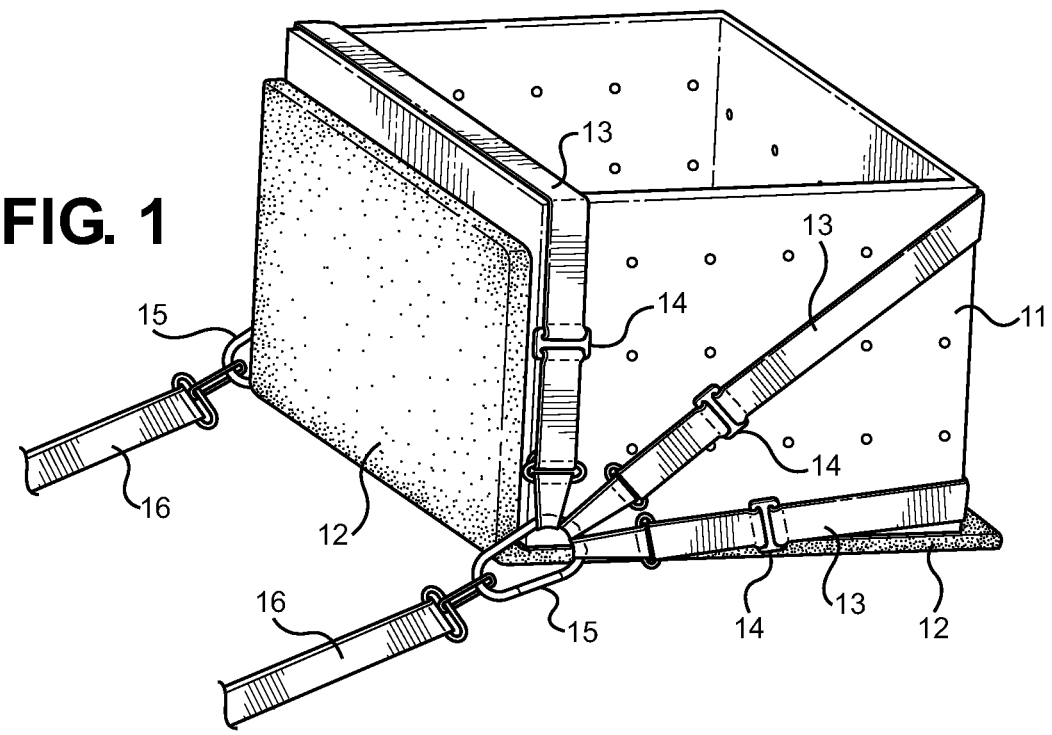
FIG. 1 shows a perspective view of an embodiment of the present invention.

Reference is made herein to the attached drawings. Like reference numerals are used throughout the drawings to depict like or similar elements of the horseback saddle carrier device. For the purposes of presenting a brief and clear description of the present invention, the preferred embodiment will be discussed as used for supporting a pet animal within the device while horseback riding. The figures are intended for representative purposes only and should not be considered to be limiting in any respect.

Referring now to FIG. 1, there is shown a perspective view of a first embodiment of the carrier device of the present invention. The device comprises a housing 11 having upstanding sidewalls, an open upper and a base surface forming a rectangular enclosure and an interior volume. The sidewalls comprise left and right sidewalls, a rear wall and a forward wall defined by the orientation of the device with respect to a horse when mounted. A compressible pad 12 is connected along the forward wall and extends along the base of the housing to provide a layer of comfort padding along the bearing surfaces of the housing. The forward wall is adapted to be drawn towards a saddle and bear thereagainst, while the base of the housing is adapted to rest on a horse croup region. The padding 12 provides a compressible layer between the weight of the housing and its contents, as well as a layer that conforms to the backside of a saddle when drawn thereagainst.

Straps 13 are situated along the left and right sides of the housing 11 and include length adjusters 14 for adjusting the strap tension along the housing. In this first embodiment, the straps wrap around the left and right sides, two of the straps continuing around the backside of the housing and a third strap supported long the forward opening of the housing. The straps 13 surround the housing 11 in a zero, ninety and forty-five degree angle with respect to the housing base to restrict movement when the housing straps are tightened and secured to a horse saddle. The straps 13 converge into a singular connection 15 along both sides of the housing to allow connection to a forward saddle strap 16 that connects to a saddle girth forward of the housing location. The forward strap 16 is also length adjustable to tension or loosen the securement of the housing and thus the compression of the pad 12 against the saddle and the horse. The housing straps 13 are tensioned accordingly to prevent any slacking of the straps 13 about the housing. In this embodiment, the housing straps 13 are continuous and can be supported along the housing exterior by support loops or similar retaining structures that prevent loosening or slipping of the straps during deployment.

Figure 2:
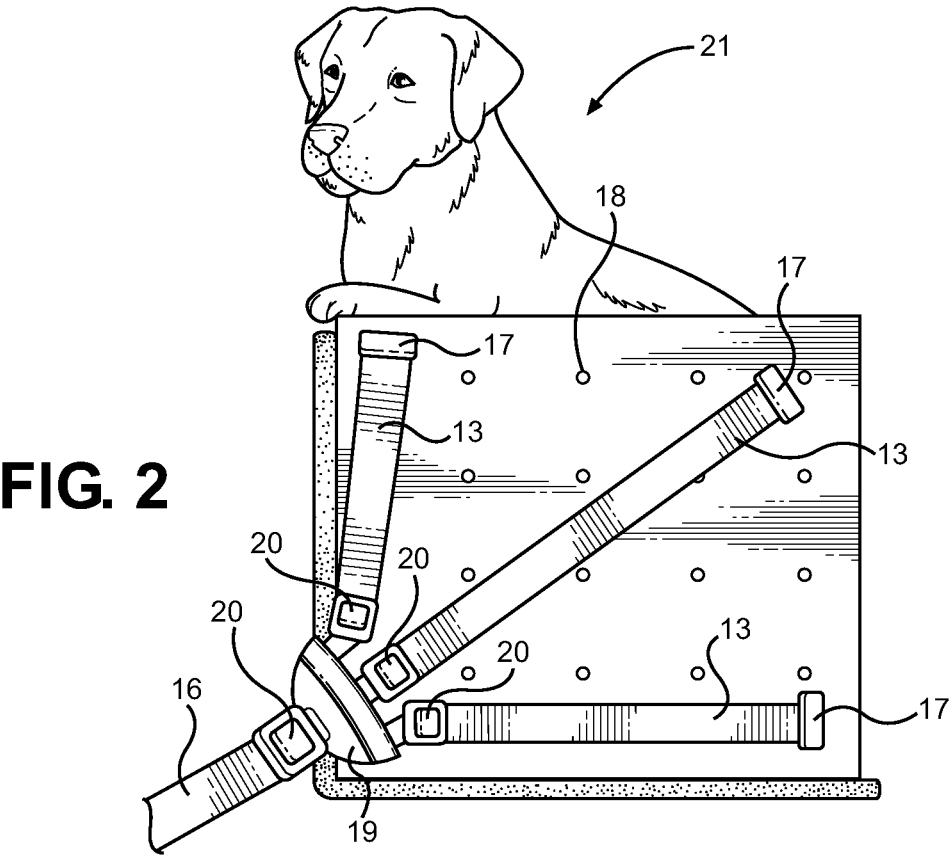
FIG. 2 shows a side view of another embodiment of the present invention in a working state, supporting a dog therein.

Referring now to FIG. 2, there is shown a side view of a second embodiment of the present invention, along with a contemplated use of the housing. The desired use for the device is to transport animals 21 and pets within the housing such that the user is not required to physically support the animal. The sides of the housing may include apertures 18 to allow ventilation and improved air flow for smaller dogs, while the overall size of the housing may vary based on anticipated pet size. If the user requires increased carrying capacity, the device may be utilized for personal item storage, whereby smaller or larger housings may be provided based on required storage space. In this second embodiment of the present invention, the housing straps 13 are secured along the housing left and right sides at attachment or mounting points 17. From the attachment points 17, the straps 13 are directed to a common connector or junction 19 that combines the three straps into a single forward strap 16 via quick release clasps 20 or similar mechanical connectors. The housing straps 13 may be adjustable in length, as is the forward saddle strap 16 leading to a horse saddle girth. The common connector 20 may be a 3-to-1 strap buckle reducer as seen in child safety seats, or may be a connector loop such as a carabineer making connection to each strap via a clip. This second embodiment relates to the connection of the housing straps 13 to the housing, whereby mounting points or attachment points 17 are provided along each housing side.

Figure 3:
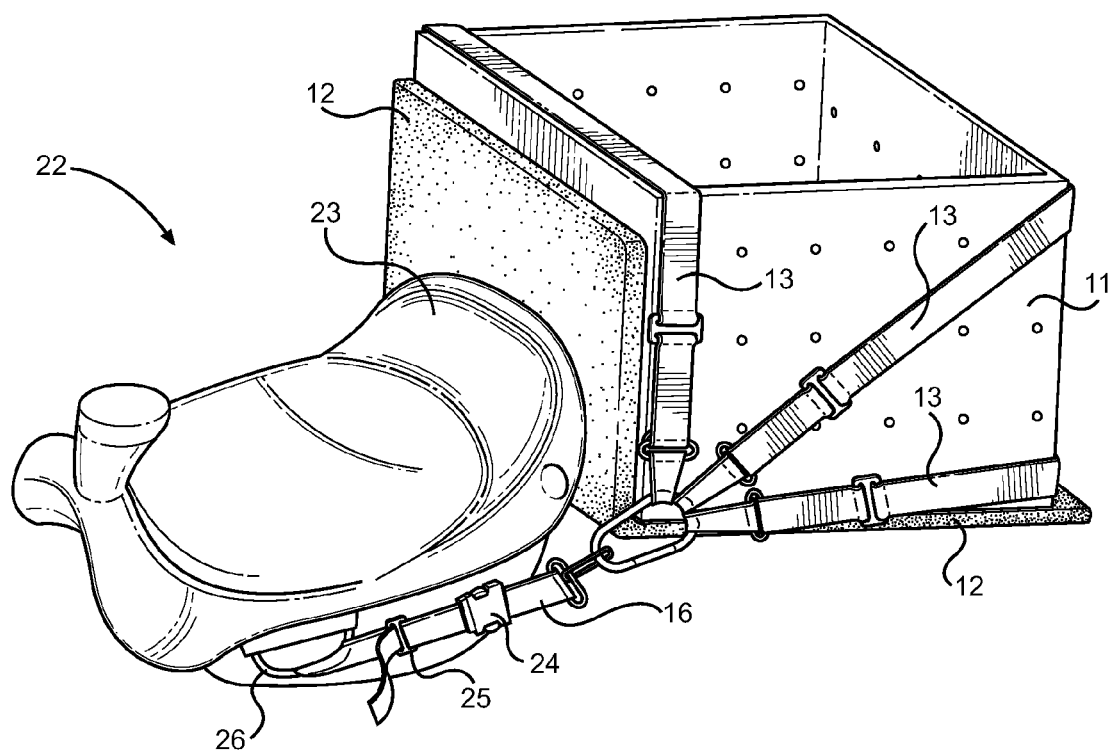
FIG. 3 shows an overhead perspective view of the device in connection with a horse saddle.

Referring now to FIG. 3, there is shown a perspective view of the present invention in connection with a horse saddle 22 and in a working state. The forward saddle strap 16 includes a first and second end and an adjustable length. The first end connects to the side straps via a singular connection point, while the second end connects to the saddle girth 26 along the side of the saddle 22. Along the saddle strap length may include a quick release buckle 24 and a length adjuster element 25 that allows the strap 16 to be quickly disconnected and tensioned, respectively. A saddle strap 16 is provided on both sides of the saddle, whereby the housing 11 can be drawn towards the backside of the saddle cantle 23 to prevent relative movement during riding exercises. As the saddle straps 16 are tensioned, the housing is pulled forward against the cantle 23, while the compressible pad 12 conforms to the cantle to prevent damage thereto. The side straps 13 allow the tension from the forward saddle strap 16 to encircle the housing and prevent dislodgment of the housing 11 while a pet or a plurality of items are placed therein.

Figure 4:
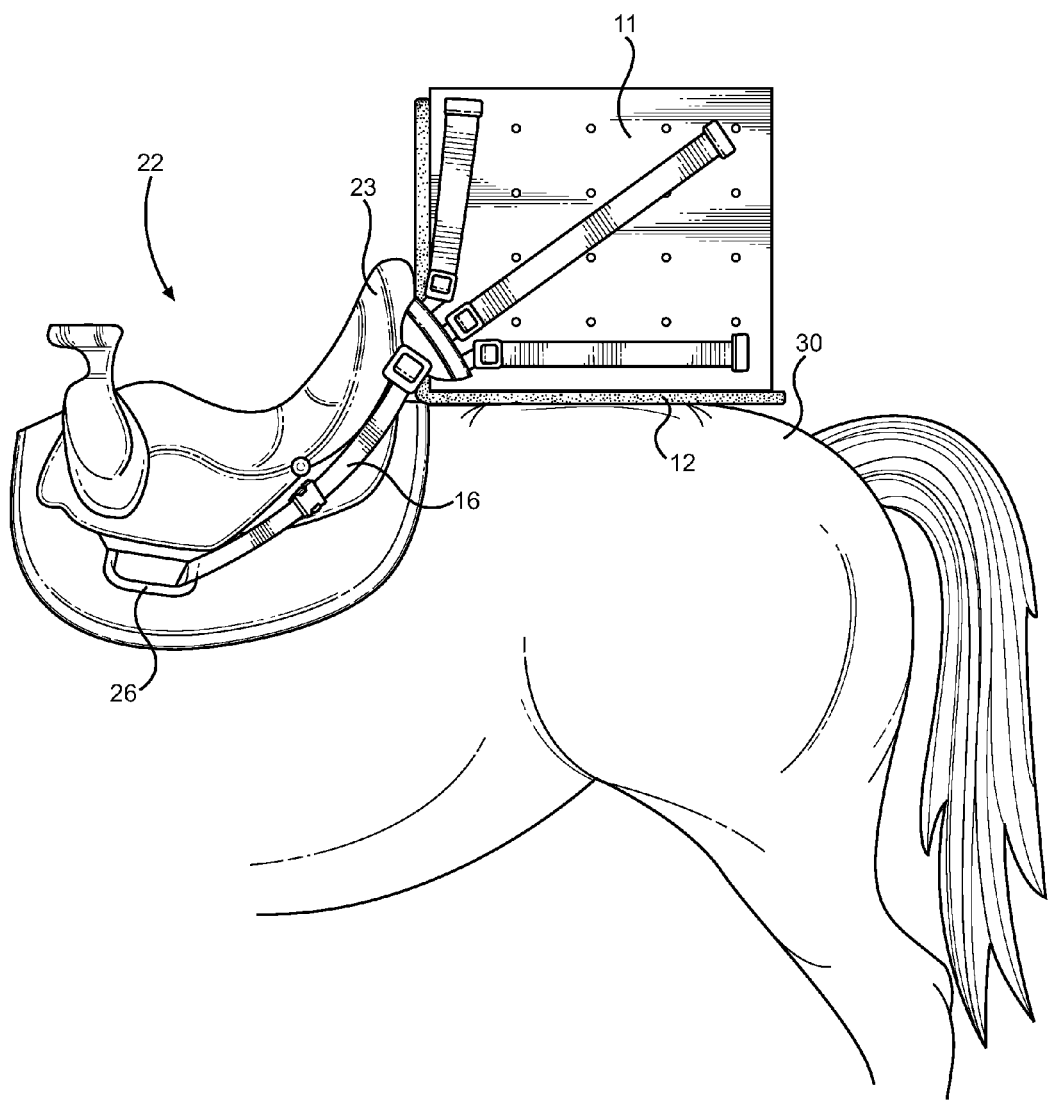
FIG. 4 shows a side view of the device in connection with a horse saddle and supported by a horse in the device deployed state.

Referring now to FIG. 4, there is shown a side view of the present invention in a working state, positioned on a horse croup 30 and drawn against the backside of a cantle 23 of the saddle 22. This view shows the second embodiment of the present invention, wherein the housing straps originate along the sides of the housing 11 instead of wrapping therearound. As the forward saddle strap 16 is tensioned between the saddle girth 26 and the housing 11, the housing is drawn against the cantle 23, while the pad 12 provides a barrier to prevent rubbing and non-uniform contact thereagainst. The pad 12 further provides a compressible barrier for comfort of the horse, allowing some attenuation of bearing loads against the horse due to the weight of the housing and its contents.

The present invention is designed to utilize the structure and securement of a saddle as a structural support for an attached accessory. The housing of the present invention allows a user to carry personal items or pets therein while horseback riding, while its structure is simple and readily attachable to any saddle having an exposed girth for which a strap to attach thereto. The straps, their adjusters, and the strap connectors are common elements in the art of strap tensioners and strap securement elements. It is not desired to limit the present invention to an exact connector (i.e. clasp, buckle, carabineer, etc.) or strap design, but rather it is desired to disclose a housing having straps that connect to a forward saddle strap along both sides of the housing to secure the assembly to a saddle during riding. The size of the housing and arrangement of the straps may take any form, falling within the scope of the present disclosure and utilizing elements known in the art of horseback accessories and strap securement devices.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A horseback saddle carrier, comprising:
   a housing having an upstanding rear wall, an upstanding forward wall, and an upstanding first and second sidewall connecting said forward and rear wall, an open upper portion, and a base surface;
   one or more compressible pads covering exterior faces of said base surface, and said upstanding forward wall;
   a first, second and third housing strap along said housing sidewalls, said housing straps connecting to a first and second common junction, wherein said first and second common junction are disposed near opposing lower, forward, exterior corners of said sidewalls when in use;
   said first housing strap extending substantially vertically upward from said first and second common junction along said sidewalls and around said housing;
   said second housing strap extending diagonally from said first and second common junction along said sidewalls and at a substantially 45 degree angle from said first housing strap and extending around said housing;
   said third housing strap extending substantially horizontally from said first and second common junction along said sidewalls and at an angle substantially 90 degrees from said first housing strap and extending around said housing;
   a first and second forward saddle strap having a first and second end, said first end connecting to one of said common junctions and said second end adapted to connect to a saddle girth strap.

2. The device of claim 1, wherein said housing straps extend around said housing exterior.

3. The device of claim 1, wherein said housing straps originate from sidewall mounting points along an upstanding first and second sidewall.

4. The device of claim 1, wherein said common junction further comprises 3-to-1 strap reducer.

5. The device of claim 1, wherein said housing straps further comprise length adjuster elements.

6. The device of claim 1, wherein said forward saddle straps further comprise length adjuster elements.

7. The device of claim 1, wherein said forward saddle straps further comprise quick release buckles along their length.

8. The device of claim 1, wherein said housing further comprises breathing hole apertures for carrying an animal therein.

* * * * *